US012768697B2

(12) United States Patent
Shim-Ping et al.

(10) Patent No.: US 12,768,697 B2
(45) Date of Patent: Oct. 20, 2026

(54) GEARBOX FLUID MEASURING DIPSTICK

(71) Applicant: Progress Rail Locomotive Inc., LaGrange, IL (US)

(72) Inventors: Nicholas Shim-Ping, Deer Park, IL (US); Jeffrey E. Jensen, Park Ridge, IL (US); Saket A. Mishra, Burr Ridge, IL (US)

(73) Assignee: Progress Rail Locomotive Inc., LaGrange, IL (US)

(*) Notice: Subject to any disclaimer, the term of this patent is extended or adjusted under 35 U.S.C. 154(b) by 304 days.

(21) Appl. No.: 18/432,554

(22) Filed: Feb. 5, 2024

(65) Prior Publication Data

US 2025/0251269 A1 Aug. 7, 2025

(51) Int. Cl.
*G01F 23/04* (2006.01)
*F16H 57/04* (2010.01)

(52) U.S. Cl.
CPC ......... *G01F 23/04* (2013.01); *F16H 57/0449* (2013.01)

(58) Field of Classification Search
CPC ........................................................ G01F 23/04
USPC ........................................... 73/290 R; 33/722
See application file for complete search history.

(56) References Cited

U.S. PATENT DOCUMENTS 946,695 A * 1/1910 Dinsmoor ............... G01F 23/04 33/494
2,273,549 A * 2/1942 Youngberg ............. G01F 23/04 33/729
2,293,005 A * 8/1942 Love, Jr. ................. G01F 23/04 40/666
3,488,855 A * 1/1970 Howe ..................... G01F 23/04 33/729
3,722,102 A * 3/1973 Jackson .................. G01F 23/04 33/731
4,021,924 A * 5/1977 Haines .................... G01F 23/04 33/726
4,476,714 A 10/1984 Barry et al.
4,640,126 A 2/1987 Jansch
5,022,495 A * 6/1991 Lavender ............... F01M 11/04 184/105.1
5,485,681 A 1/1996 Hitchcock
7,191,542 B2 * 3/2007 Oyama ................... G01F 23/04 33/729
7,584,547 B2 * 9/2009 Keith ...................... G01F 23/04 33/722

(Continued)

FOREIGN PATENT DOCUMENTS

BR 102022019899 A2 * 10/2023 ........... G01F 23/268
DE 10154072 A1 5/2003

(Continued)

*Primary Examiner* — John Fitzgerald

(57) ABSTRACT

A measuring dipstick for a gear case of a train includes a handle configured to extend outside of the gear case when the measuring dipstick extends within an opening of the gear case and an insertion portion. The insertion portion includes a plurality of level indicators spaced along the insertion portion at intervals, a bend in the insertion portion that separates a proximal portion of the insertion portion from a distal portion of the insertion portion, and an orientation indicator configured to identify a correct orientation for the measuring dipstick when the insertion portion is inserted within the opening of the gear case.

20 Claims, 5 Drawing Sheets

(56) References Cited

U.S. PATENT DOCUMENTS

| | | | | |
|---|---|---|---|---|
| 8,881,421 | B2 * | 11/2014 | Krishnamurthy | G01F 23/04 33/728 |
| 9,200,941 | B1 * | 12/2015 | Kelly | G01F 23/04 |
| 9,804,014 | B2 * | 10/2017 | Shigemoto | G01F 23/04 |
| 11,396,976 | B1 * | 7/2022 | Bodary | B03C 1/288 |
| 11,614,354 | B2 * | 3/2023 | Swenson | F01M 11/12 73/290 R |
| 11,708,939 | B2 | 7/2023 | Bodary et al. | |
| 2006/0075651 | A1 * | 4/2006 | Hamlet | G01F 23/04 33/722 |
| 2008/0314141 | A1 * | 12/2008 | Keith | G01F 23/04 73/290 R |
| 2010/0018308 | A1 * | 1/2010 | Liimatta | G01F 23/04 73/114.77 |
| 2013/0305552 | A1 * | 11/2013 | Krishnamurthy | G01F 23/04 33/728 |
| 2022/0290806 | A1 * | 9/2022 | Bodary | B03C 1/288 |

FOREIGN PATENT DOCUMENTS

| | | | | | |
|---|---|---|---|---|---|
| JP | 5706799 | B2 * | 4/2015 | | |
| KR | 20070040052 | A * | 4/2007 | | F16H 57/04 |
| KR | 20080042079 | A * | 5/2008 | | G01F 23/04 |

* cited by examiner

GEARBOX FLUID MEASURING DIPSTICK

TECHNICAL FIELD

This disclosure relates generally to gearbox systems on trains, and more particularly, to a gearbox measuring dipstick for measuring an amount of gearbox fluid remaining in a gearbox, for example, between service intervals.

BACKGROUND

Rail vehicles, such as trains, may be powered by one or more locomotives and can include a number of interconnected cars. Trains typically include one or more transmissions or gearboxes, for example, which convert and/or transmit energy (e.g., torque) from one or more engines or traction motors to one or more drive systems or wheels. For example, the one or more transmissions or gearboxes receive input(s) from a shaft coupled to the engine(s) or traction motor(s). The one or more transmissions or gearboxes include a set of reduction gears housed within a gear case, and that are connected to one or more wheel shafts via one or more pinions, gears, etc. The gearbox often includes or contains a lubricant or other fluid, for example, to lubricate or cool the gears and/or other moving components of the gearbox. The lubricant or fluid may evaporate, leak, burn, or otherwise escape from the gearbox over time and/or during operation. However, it may be difficult to measure or otherwise observe a loss of the lubricant or fluid from the gearbox, especially between service intervals. Additionally, inspection of a gearbox is often performed in dimly lit or dark environments, which may further impair the ability of a technician to measure or otherwise observe an amount of lubricant or fluid that remains within the gearbox.

U.S. Pat. No. 11,708,939, issued to Bodary et al. on Jul. 25, 2023 ("the '939 patent"), describes an axle assembly that includes a housing assembly and a dipstick assembly. The housing defines a cavity that receives a lubricant, and a portion of the dipstick assembly is removably mountable to the housing assembly. The dipstick assembly includes a fitting and a dipstick. The dipstick assembly of the '939 patent can help a user measure a level of lubricant in the housing assembly. However, the dipstick assembly of the '939 patent may not be able to measure and/or indicate a level of gearbox fluid in a locomotive, for example, in dimly lit or dark environments between service intervals. Additionally, the dipstick assembly of the '939 patent may not accurately measure locomotive gearbox fluid levels, for example, with the gearbox having a particular size and/or shape, and may also not help to ensure proper orientation of the dipstick assembly relative to the housing or gearbox.

The devices and methods of this disclosure may address or solve one or more of the problems set forth above and/or other problems in the art. The scope of the current disclosure, however, is defined by the attached claims, and not by the ability to solve any specific problem.

SUMMARY

In one aspect, a measuring dipstick for a gear case of a train may include a handle configured to extend outside of the gear case when the measuring dipstick extends within an opening of the gear case and an insertion portion. The insertion portion may include a plurality of level indicators spaced along the insertion portion at intervals, a bend in the insertion portion that separates a proximal portion of the insertion portion from a distal portion of the insertion portion, and an orientation indicator configured to identify a correct orientation for the measuring dipstick when the insertion portion is inserted within the opening of the gear case.

In another aspect, a method for measuring a fluid level in a train may include removing a cap on a fill spout and inserting a measuring dipstick into the fill spout, wherein the measuring dipstick includes a plurality of level indicators spaced along an insertion portion and a bend in the insertion portion that separates a proximal portion of the insertion portion from a distal portion of the insertion portion, the measuring dipstick being oriented based on an orientation indicator present on the measuring dipstick. The method may further include removing measuring dipstick from fill spout, inspecting the measuring dipstick, and replacing the cap on fill spout.

In yet another aspect, a measuring dipstick for a gear case of a train may include a handle portion configured to extend outside of the gear case when the measuring dipstick extends within an opening of the gear case and an insertion portion including a plurality of indicators spaced along the insertion portion, the indicators formed at a proximal portion of the insertion portion and at a distal portion of the insertion portion, the distal portion extending in a different direction than the proximal portion.

BRIEF DESCRIPTION OF THE DRAWINGS

The accompanying drawings, which are incorporated in and constitute a part of this specification, illustrate various exemplary embodiments and together with the description, serve to explain the principles of the disclosure.

DETAILED DESCRIPTION

Both the foregoing general description and the following detailed description are exemplary and explanatory only and are not restrictive of the features, as claimed. As used herein, the terms "comprises," "comprising," "has," "having," "includes," "including," or other variations thereof, are intended to cover a non-exclusive inclusion such that a process, method, article, or apparatus that comprises a list of elements does not include only those elements, but may include other elements not expressly listed or inherent to such a process, method, article, or apparatus. Further, relative terms, such as, for example, "about," "substantially," "generally," and "approximately" are used to indicate a possible variation of ±10% in a stated value.

Figure 1:
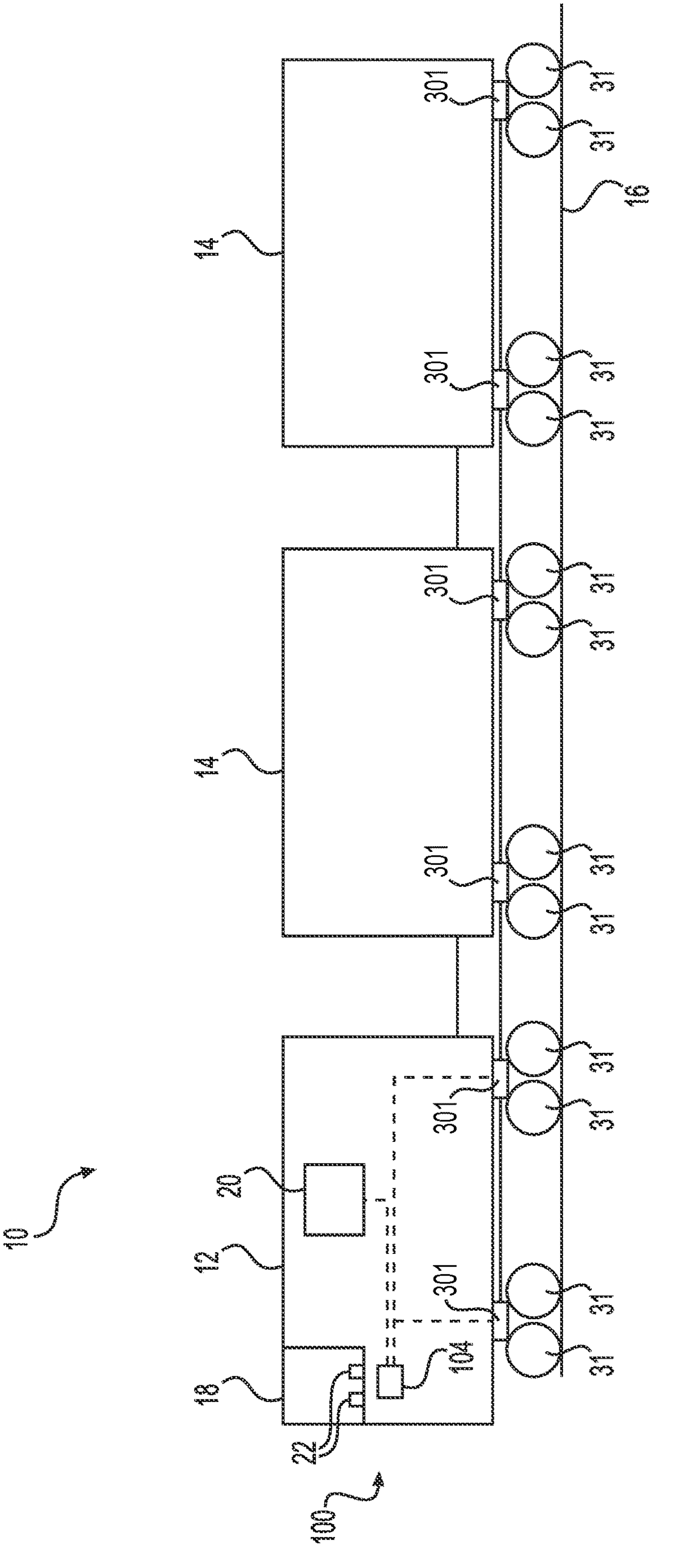
FIG. 1 illustrates a schematic side view of an exemplary train including a gearbox system, according to aspects of the disclosure.

FIG. 1 illustrates a schematic side view of a train 10 including a gearbox system 100, according to aspects of the disclosure. Train 10 may include a locomotive 12 that may pull and/or push one or more cars 14 along rails 16. Locomotive 12 may include an operator cab 18 and an engine 20 to power locomotive 12 in order to propel the cars 14 along rails 16, for example, via respective wheels 31 on locomotive 12 and cars 14. Engine 20 may include one or more engines, turbines, electric motors, electromagnetic systems, or any other type of power source known in the art. A fuel or energy source may be carried aboard the train 10 in the form of fuel and/or battery power, or may be positioned along or above the rails 16, such as by an additional power source rail (e.g., a third rail, overhead power lines, etc.). Engine 20 may be coupled to one or more gearboxes 104, and gearbox(es) 104 may drive or otherwise be coupled to one or more wheels 31 of locomotive 12.

Operator cab 18 may include one or more control interfaces 22 that may provide notifications and control aspects of train 10. Control interface(s) 22 may include buttons, levers, computer interfaces, and/or any other type of interface for providing notifications and/or controlling train 10. Accordingly, an operator in cab 18 may receive notifications and control train 10 using control interface 22. It is understood that train 10 may also be operated remotely (e.g., by an offboard operator) and/or may be operated automatically (e.g., without operator intervention). Further, while a single locomotive 12 and two cars 14 are illustrated in FIG. 1, it is understood that train 10 may consist of any number of locomotives 12 and/or cars 14 connected and positioned in any configuration, as necessary.

Figure 2B:
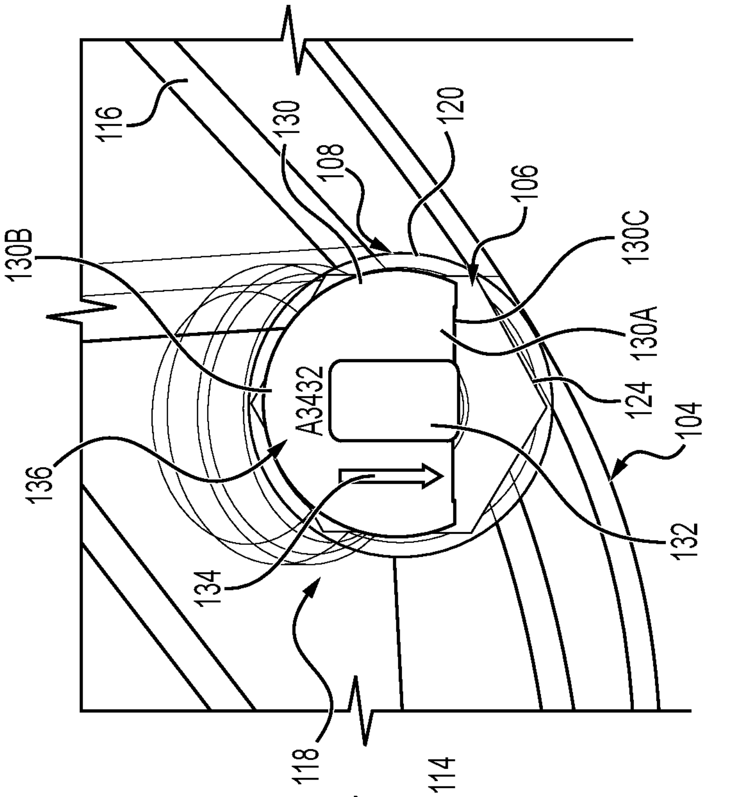
FIG. 2B illustrates an end view of the measuring dipstick and a portion of the gearbox system.
Figure 2A:
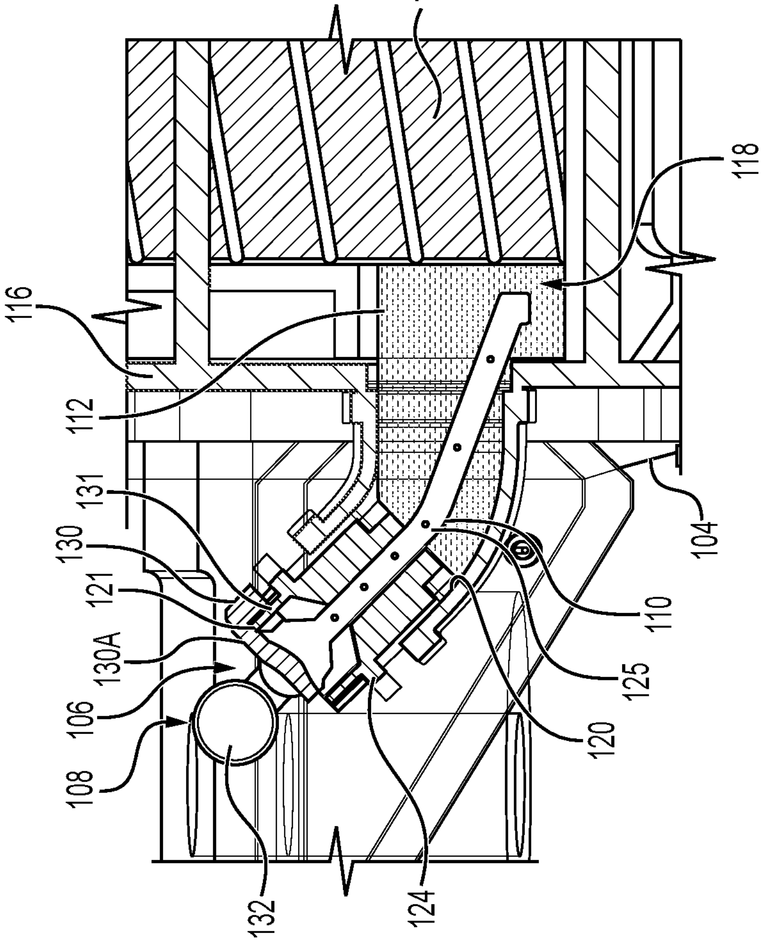
FIG. 2A illustrates a cross-sectional view of the gearbox system and a measuring dipstick.
Figure 2C:
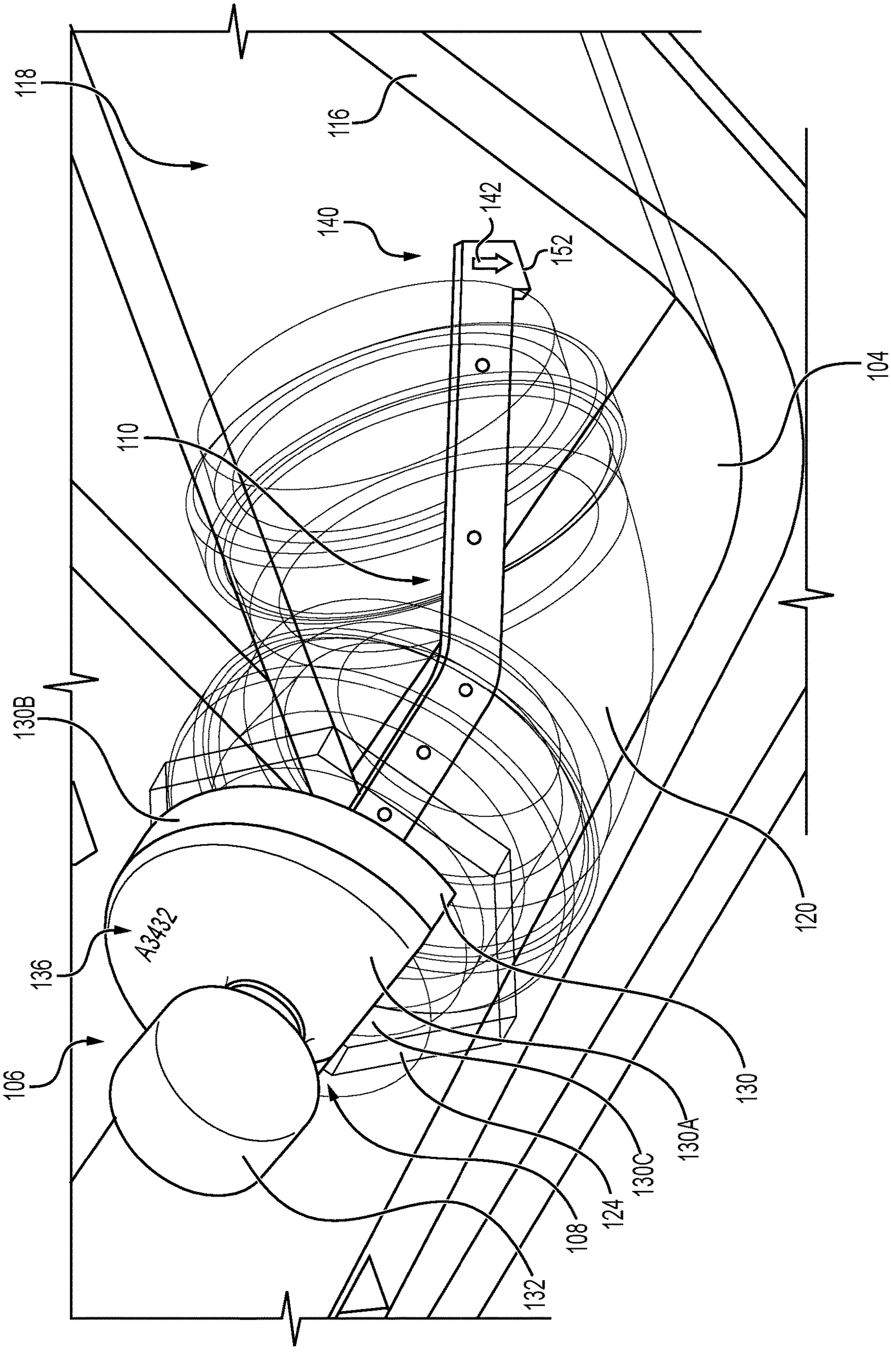
FIG. 2C illustrates a perspective view of the measuring dipstick, with a portion of the gearbox system being transparent.

FIGS. 2A-2C illustrate various aspects of a measuring dipstick 106 relative to one gearbox 104, for example, of gearbox system 100 (FIG. 1). FIG. 2A is a cross-sectional view of measuring dipstick 106 extended into a portion of gearbox 104. Measuring dipstick 106 includes a handle portion 108 and a dipstick portion 110 including a bend 125, dipstick portion 110 being configured for being positioned within a portion of gearbox 104 to measure a level of a fluid 112 (e.g., lubricant, coolant, etc.) within gearbox 104. While, in the example of FIG. 2A, fluid 112 is shown only in a portion of opening 118 and fill spout 120, as understood, fluid 112 is also in contact with gears 114 and may extend within a guide insert 124, described below.

Gearbox 104 includes a plurality of gears 114 within a gear case 116. Additionally, gear case 116 may include one or more spaces or openings 118, for example, adjacent to gears 114. Gear case 116 further includes one or more fill spouts 120, which may be opened by removing a cap (not shown) to deliver or add a lubricant, a coolant, or other fluid 112. As shown, fill spout 120 may extend at an angle from gear case 116 (e.g., from opening 118). Furthermore, a portion of measuring dipstick 106 may be delivered into a portion of gearbox 104 (e.g., into opening 118) via fill spout 120. Fill spout 120 may receive a cap to seal fill spout 120, and thus seal gear case 116 when in operation.

In some aspects, guide insert 124 may be placed within fill spout 120 to facilitate placement of measuring dipstick 106. As shown in FIG. 2A, guide insert 124 may include a central through-hole sized to receive dipstick portion 110, the through-hole being sized to also receive fluid 112. Guide insert 124 may facilitate removal of measuring dipstick 106 from insert 124 (e.g., by being sized and/or formed of a compliant material to accommodate removal of bend 125). If desired, guide insert 124 may include a protrusion 131 (e.g., an annular surface or a portion of an annular surface). Measuring dipstick 106 may include a surface 121 (e.g., a recess formed opposite of flat proximal face 130A as shown in FIG. 2A) configured to contact protrusion 131 when measuring dipstick 106 is inserted into guide insert 124. Guide insert 124 may be sized to reach a predetermined depth within fill spout 120 (e.g., via interference with the inner circumference of fill spout 120). This may, in turn, cause measuring dipstick 106 to reach a predetermined depth within fill spout 120 with level indicators (described below) reaching predetermined positions inside fill spout 120.

FIG. 2B is an end view of measuring dipstick 106, including handle portion 108. Handle portion 108 includes a main body 130 and a knob 132. Main body 130 may include a flat proximal face 130A from which knob 132 protrudes. Additionally, main body 130 may include a rounded portion 130B on a first lateral side of main body 130 and a flat portion 130C on a second opposite lateral side of main body 130. Rounded portion 130B may be configured to provide alignment with a fill cap and/or fill spout 120. In particular, rounded portion 130B may be concentric with respect to fill spout 120 and/or with insert 124, preventing spillage when checking oil level. When measuring dipstick 106 is positioned within fill spout 120, rounded portion 130B may be generally upward facing, and flat portion 130C may be generally downward facing and forming an edge aligned with a horizontal direction, as shown in FIG. 2B.

In some aspects, flat portion 130C may abut or otherwise interface with insert 124, for example, to help position measuring dipstick 106 relative to fill spout 120 and to gear case 116. For example, flat portion 130C may form a hard stop against a surface of fill spout 120 or against insert 124. This stop may limit displacement of dipstick portion 110 when measuring dipstick 106 is inserted into fill spout 120, aiding placement of measuring dipstick in the desired orientation and depth in fluid 112.

Knob 132 may extend (e.g., proximally) from main body 130. Additionally, knob 132 may be generally circular when viewed from the side (e.g., as shown in FIG. 2A), and may be generally rectangular, for example, with rounded edges or corners, when viewed from the end (e.g., as shown in FIG. 2B). The straight side surfaces of knob 132 may facilitate gripping and rotation of measuring dipstick 106.

With reference to FIG. 2B, a portion of handle portion 108, for example, proximal face 130A of main body 130 may include one or more indicators 134. In some aspects, indicator(s) 134 may include an arrow, for example, indicating a downward direction corresponding to an arrangement or positioning of handle portion 108, and thus gearstick portion 110, when properly positioned within fill spout 120. In some aspects, handle portion 108 may also include one or more identifiers 136 (another example of an indicator), for example, corresponding to a part with which measuring dipstick 106 is intended for use (e.g., a part number of measuring dipstick 106, a type or style of locomotive 12, a type or style of gearbox system 100, a type or style of gearbox 104, motor 301, a type or style of gear case 116, etc.). In these aspects, the one or more identifiers 136 may help a user to ensure that measuring dipstick 106 is the appropriate measuring dipstick to be used with locomotive 12, gearbox system 100, gearbox 104, motor 301, gear case 116, etc. In these examples, identifier 136 may be a part-identifying indicator. Furthermore, indicator(s) 134 and/or identifier(s) 136 may be stamped onto handle portion 108, for example, via a rubber stamp, molded as protrusions or indentations, etc. While indicator 134 is shown as a symbol, an arrow, and identifier 136 is shown as alphanumeric characters ("A3432"), as understood, indicator 134 may include one or more alphanumeric characters and identifier 136 may include a symbol or a form other than alphanumeric characters.

As shown in FIG. 2C, a portion (e.g., at a distal end 140) of dipstick portion 110 may include one or more indicators 142. As with indictor 134, indicator 142 may be an arrow or other symbol. Additionally, indicator 142 may also be raised (e.g., elevated from) the surrounding surface. As such, the user may be able to tactilely feel indicator 142, and the corresponding direction that indicator 142 is pointing, even when the surroundings are dark.

As also shown in FIG. 2C, the shape of distal end 140 may itself form or include an indicator. For example, an extension 152 at distal end 140 may protrude away from a center (e.g., a longitudinal center) defined by dipstick portion 110. Extension 152 may be formed as a different color or material than other portions of dipstick portion 110, if desired, to improve visibility, durability, and functionality of fluid on extension 152.

Figure 3B:
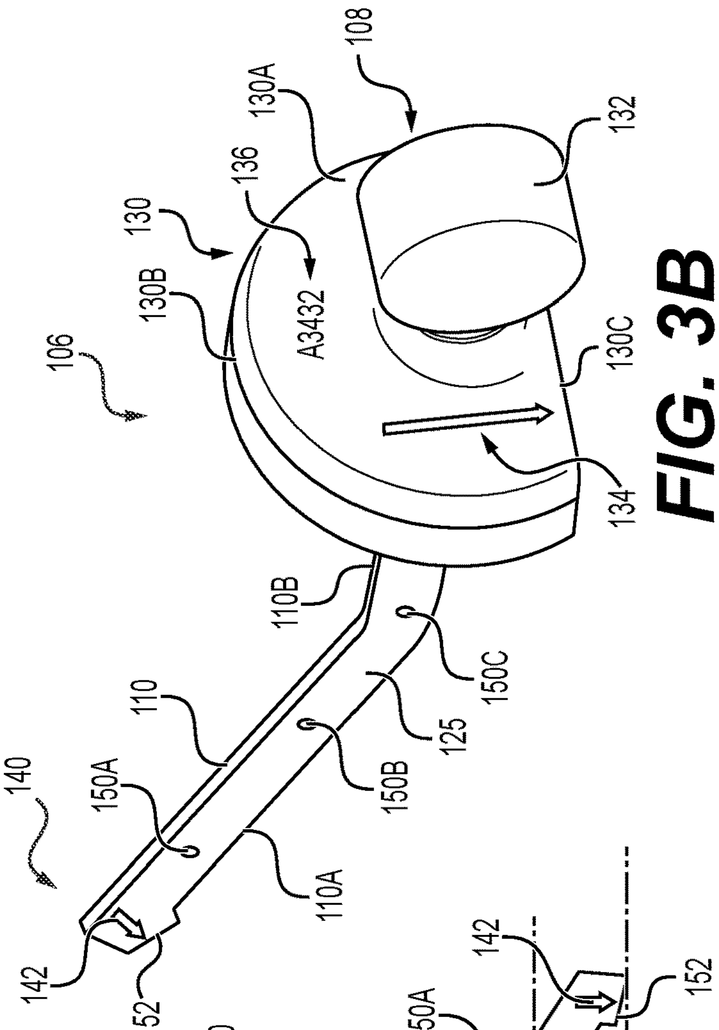
FIG. 3B is a perspective view of the measuring dipstick.
Figure 3A:
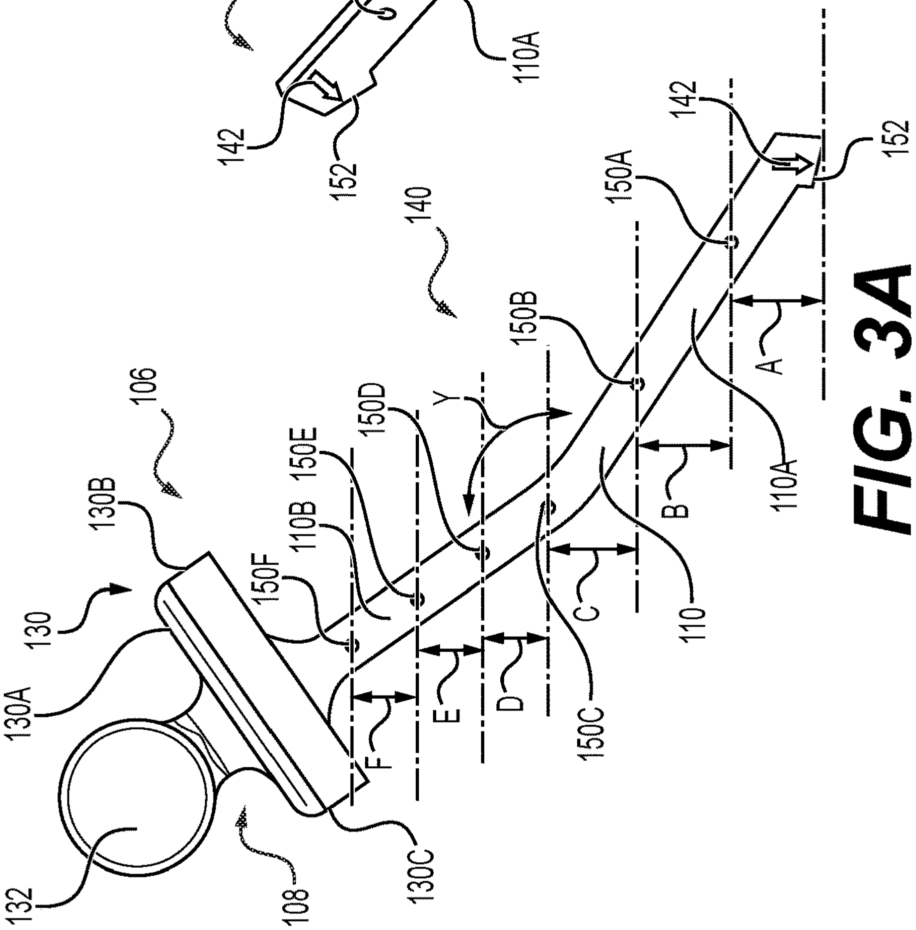
FIG. 3A is a side view of the measuring dipstick.

FIGS. 3A and 3B illustrate side and perspective views of measuring dipstick 106, respectively. As mentioned, measuring dipstick 106 includes handle portion 108 and dipstick portion 110. Dipstick portion 110 includes bend 125 (FIG. 3B), which may separate dipstick portion 110 into a proximal portion 110B and a distal portion 110A, the distal and proximal portions 110A, 110B extending in different directions. Bend 125 may be formed as a relatively sharp, angled corner, or may be curved and more gradual. In some aspects, the proximal portion and distal portion of dipstick portion 110 may form an angle Y that is defined by bend 125. Angle Y may have a value that is based on the shape of fill spout 120 and opening 118. In some examples, angle Y may be in a range of about 10 degrees to about 90 degrees, about 20 degrees to about 80 degrees, or about 30 degrees to about 70 degrees.

Dipstick portion 110 may include other types of indicators, for example, a plurality of holes 150A-150F forming level indicators that indicate the level of fluid 112. Holes 150A-150F may be through-holes that form markers (as used herein, "markers" may also refer to "indicators") in the stem of dipstick portion 110, and may be circular (as shown). Alternatively, holes 150A-150F may be blind holes and/or may have a triangular, rectangular, pentagonal, or any other regular or irregular shape that forms a marking on dipstick portion 110. Holes 150A-150F are spaced apart along dipstick portion 110, for example, along first portion 110A and second portion 110B. Instead of holes 150A-150F, indicators may be formed as protrusions and/or features having a color that is different from the color(s) of the remainder of dipstick portion 110.

The position of holes 150A-150F may correspond to levels of fluid 112 within gearbox 104. For example, FIG. 3A illustrates measuring dipstick 106 in the orientation that measuring dipstick 106 is in when positioned within fill spout 120 (e.g., as in FIGS. 2A and 2C). In this orientation and when viewed from the side as shown in FIG. 3A, hole 150A may be spaced apart from a bottom of dipstick portion 110 by a vertical distance A. Hole 150B may be spaced apart from hole 150A by a vertical distance B. Hole 150C may be spaced apart from hole 150B by a vertical distance C. Hole 150D may be spaced apart from hole 150C by a vertical distance D. Hole 150E may be spaced apart from hole 150D by a vertical distance E. Furthermore, hole 150F may be spaced apart from hole 150E by a vertical distance F.

Vertical distances A-F may be the same vertical distance, for example, approximately 0.5 to approximately 5 cm, for example, approximately 2 cm in the vertical distance, when measuring dipstick 106 is viewed from the side and positioned at the same orientation as when measuring dipstick 106 is placed within gear case 116. However, in some aspects, one or more of vertical distances A-F may be different from other distances A-F. For example, distances A, B, and/or C located on a distal half of insertion portion 110 may be larger than one or more of distances D, E, or F on a proximal half of portion 110. In this example, distances A, B, and C may be equivalent to each other, and distances D, E, and F are equivalent to each other. Whether the same or different, the vertical spacing formed by distances A-F may be set based on the particular part with which measuring dipstick 106 is intended for use (e.g., the part indicated by identifier 136).

The positioning of holes 150A-150F may correspond to a level of fluid 112 within gearbox 104. In some aspects, the shape of handle portion 108 may help to ensure the appropriate positioning of measuring dipstick 106 relative to gearbox 104 and fill spout 120. For example, when dipstick 106 is positioned within gearbox 104, if fluid 112 reaches hole 150F, gearbox 104 may be full of fluid 112. If fluid 112 reaches hole 150E, and not hole 150F, then gearbox 104 may be approximately one quart of fluid 112 away from being full. If fluid 112 reaches hole 150D, and not hole 150E, then gearbox 104 may be approximately two quarts of fluid 112 away from being full. If fluid 112 reaches hole 150C, and not hole 150D, then gearbox 104 may be approximately three quarts of fluid 112 away from being full. If fluid 112 reaches hole 150B, and not hole 150C, then gearbox 104 may be approximately four quarts of fluid 112 away from being full. If fluid 112 reaches hole 150A, and not hole 150B, then gearbox 104 may be approximately five quarts of fluid 112 away from being full. Furthermore, if fluid 112 does not reach hole 150A, for example, only reaching indicator(s) 142 or extension 152, then gearbox 104 may be approximately six quarts of fluid 112 away from being full. In some aspects, being six quarts away from being full may be a condemning limit of fluid 112, for example, such that gearbox 104, and thus locomotive 10, should not be operated without the addition of fluid 112. If fluid 112 does not reach extension 152, this may also indicate a condemning limit of fluid 112 and/or indicate the possibility of a fluid leak.

In any of the above-described aspects, the level of fluid 112, as measured by measuring dipstick 106, may allow for the user to add fluid 112, for example, corresponding to the amount of fluid 112 needed to bring gearbox 104 up to or close to being full. For example, the user may remove measuring dipstick 106 from fill spout 120, and add fluid 112. Additionally, after adding fluid 112 to fill spout 120, the user may re-insert measuring dipstick 106 into fill spout 120 to ensure that gearbox 104 includes an appropriate level of fluid 112.

Measuring dipstick 106, and in particular, dipstick portion 110 may be formed of materials that are compatible (e.g., will not corrode or otherwise react) with fluid 112. In the example of use with gear case, dipstick portion 110 may be formed of a metal, polymer, or other material that is compatible with gearbox fluid. If desired, one or more areas of dipstick portion 110, such as indicator 142, may be formed from a material that is different from the material used for the remainder of dipstick portion 110, this different material providing a raised surface, e.g., for indicator 142.

In some aspects, handle portion 108 may include one or more materials that facilitate grip, insertion, and if necessary, rotation, of measuring dipstick 106. For example, knob 132 may be formed of a material (e.g., a resilient material) that allows a user to grip and insert measuring dipstick 106 via knob 132 in wet or dirty conditions. If desired, main body 130 may be formed with a material that facilitates placement of main body 130 on or above a surface of insert 124 (FIG. 2A).

Measuring dipstick 106 as a whole, and dipstick portion 110 in particular, may be provided with a color that facilitates inspection in low-light conditions. For example, dipstick portion 110 may include white coloring, off-white coloring, use of glow-in-the-dark material (e.g., a glow-in-the-dark nylon or plastic), pastel coloring, etc., such that relatively dark fluid 112, when present in holes 150A-150F, on indicator 142, and/or on extension 152, draws a visual contrast. The use of a relatively light-colored material, as described above, may also facilitate the identification of impurities, such as metal shavings, which indicate excessive wear. Main body 130 may include coloring that facilitates observation of indicator(s) 134 and one or more identifiers 136. Indicator(s) 134 and one or more identifiers 136 may include coloring that is different from that of main body 130.

INDUSTRIAL APPLICABILITY

The disclosed aspects of the present disclosure, for example, measuring dipstick 106, may be used for any type of train 10, including freight trains, passenger trains, or the like, to assist in controlling the train 10. If desired, measuring dipstick 106 may be used in other types of vehicles or machines.

Figure 4:
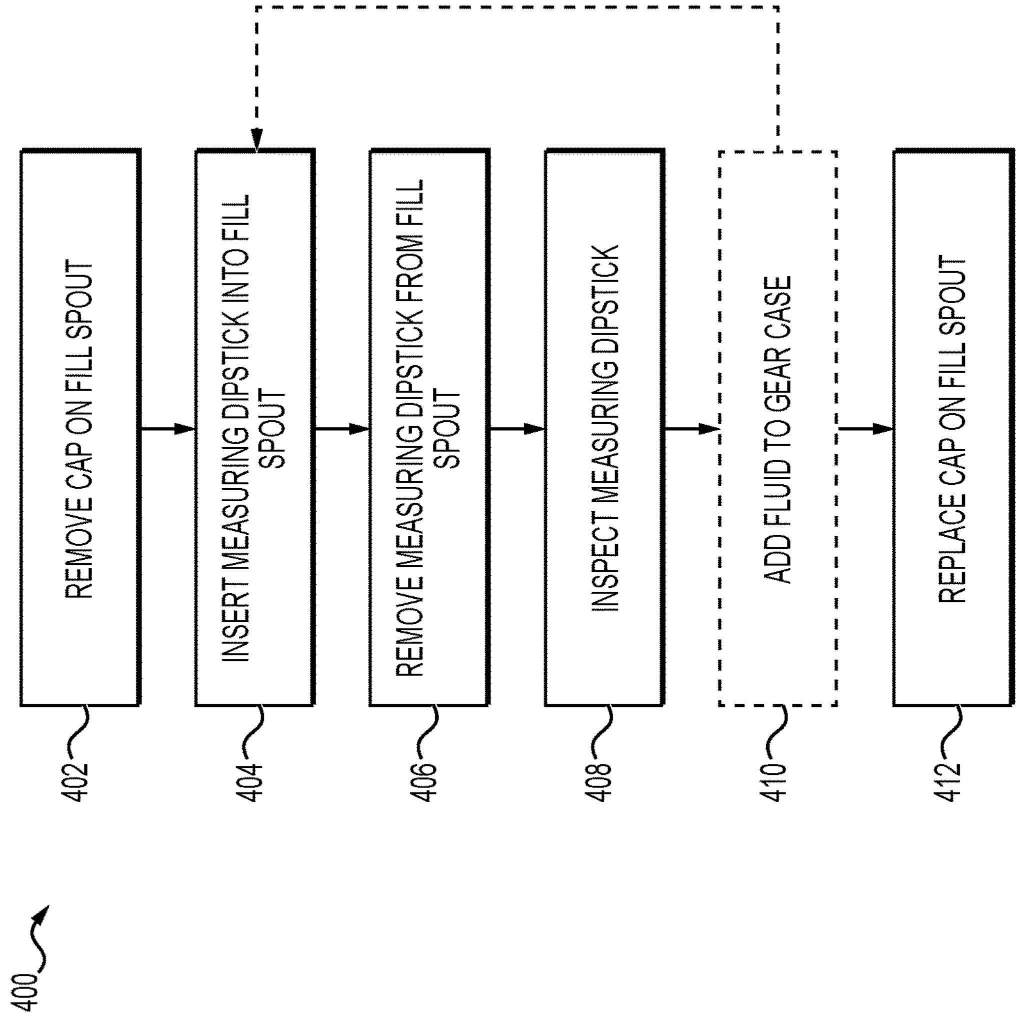
FIG. 4 is a flowchart of a method for measuring a fluid level in a gear case of a train.

FIG. 4 illustrates a flowchart depicting an exemplary method 400 for measuring a fluid level in a train 10. Method 400 may include inspecting and if desired, adjusting, a fluid level of gearbox 104 of train 10. In the exemplary embodiment, method 400 may be performed prior to train 10 departing (e.g., while train 10 is stationary). For example, method 400 may be performed while train 10 is in a railyard, a train station, a roundhouse, or the like. Method 400 may be performed between service intervals to allow fluid levels to be logged over certain periods of time or at other intervals.

In an initial step 402, a user may remove a cap from fill spout 120, exposing fill spout 120, and if present, insert 124. For example, the user may unscrew the cap to remove the cap from fill spout 120. Additionally, although not shown, step 402 may include one or more steps to access fill spout 120, for example, positioning train 10 at an inspection site or location. In some aspects, the cap may be coupled to a portion of train 10 (e.g., adjacent to fill spout 120) via one or more strings, cords, ropes, brackets, etc., for example, such that the cap is attached to a portion of the train 10 even when the cap is uncoupled from fill spout 120. If desired, measuring dipstick 106 may be physically attached to train 10 in the same manner as described above with respect to the cap for closing fill spout 120.

Next, a step 404 includes inserting measuring dipstick 106 into fill spout 120. In some aspects, step 404 may include placing insert 124 within fill spout 120 and inserting dipstick 106 through insert 124. Only dipstick portion 110 of measuring dipstick 106 may extend into fill spout 120, with handle portion 108 of measuring dipstick 106 remaining outside of fill spout 120. In some aspects, one or more portions of handle portion 108 (e.g., surface 121 or a flat surface of flat portion 130C) may abut a protrusion 131 or other end face, thereby limiting travel of measuring dipstick 106 and preventing insertion of measuring dipstick 106 to a depth that is deeper than intended, which would result in the indication of a greater amount of fluid 112 than is actually present in gear case 116. Additionally, as mentioned above, one or more indicators (e.g., on dipstick portion 110 and/or on handle portion 108) may help the user orient measuring dipstick 106 relative to fill spout 120, for example, while inserting dipstick portion 110 into fill spout 120. Moreover, dipstick portion 110 includes a plurality of holes 150A-150F, for example, or other indicators, spaced along distal and proximal portions 110A and 110B of dipstick portion 110.

When measuring dipstick 106 is positioned within fill spout 120, the plurality of indicators may be spaced apart by vertical distances A-E (FIG. 3A). Vertical distances A-E may be the same distance with each distance being equivalent. In other aspects, one or more vertical distances A-E may be different. Whether the same or different, it may be desirable for each distance A-E to represent the same increment of fluid (e.g., one quart). Indicator 134, rounded portion 130B, and flat portion 130C may indicate that measuring dipstick 106 is positioned at the correct rotational position. In the example illustrated in FIG. 2B, when measuring dipstick 106 is correctly inserted, indicator(s) 134 points downward and flat portion 130C extends in a direction that is generally horizontal.

Furthermore, a step 406 includes removing measuring dipstick 106 from fill spout 120. For example, using handle portion 108, the user may withdraw dipstick 106. If insert 124 is present, step 406 may include removing dipstick 106 from insert 124.

Next, a step 408 includes inspecting measuring dipstick 106. For example, the user may inspect measuring dipstick 106 to determine the level of fluid 112 within gearbox 104. Fluid 112 may be colored (e.g., black, brown, red, gold, honey-colored, etc.), and residual fluid may fill or otherwise occupy a portion of one or more of holes 150A-150F. For example, if residual fluid 112 fills or otherwise occupies a portion of hole 150F, the user may determine that the level of fluid 112 is full. Alternatively, if residual fluid 112 fills or otherwise occupies a portion of hole 150E, and not a portion of hole 150F, then the user may determine that the level of fluid is below a full level, for example, approximately one quart less than full. Similarly, if residual fluid 112 does not fill or otherwise occupy a portion of hole 150A, then the user may determine that the level of fluid is very low relative to the full level, for example, approximately five or more quarts less than full. As mentioned above, gearbox 104 may have a condemning limit of six quarts less than full, or lower, such that knowing the approximate level of fluid 112 may help to prevent damage to gearbox 104. Residual fluid may be present between a pair of adjacent holes 150A-150F, allowing a user to determine that a smaller amount of fluid is absent (e.g., less than an entire additional quart; a quarter of a quart, half of a quart, etc.).

Furthermore, step 408 may include inspecting a color, clarity, or one or more other qualities of fluid 112. For example, measuring dipstick 106 (e.g., at least one or more portions of dipstick portion 110) may be formed a white, off-white, pastel, and/or glow-in-the-dark material, and the user may lift measuring dipstick 106 out of fill spout 120 and hold up or otherwise expose measuring dipstick 106 to light. In these aspects, measuring dipstick 106 may allow the user to observe the color of fluid 112 and/or whether there are any particles (e.g., metallic particles) in fluid 112. The color of fluid 112 and/or the presence of particles in fluid 112 may be indicative of a quality of fluid 112 and/or a quality of gearbox 104. For example, brass particles in fluid 112 on measuring dipstick 106 may be indicative of a failed motor bearing in gearbox 104. In another example, steel particles in fluid 112 on measuring dipstick 106 may be indicative of wear on one or more gear teeth, one or more bearing rollers, one or more pinion gears (e.g., from one or more pinion gears grinding into a side of gearbox 104), etc. In these aspects, the user may be able to noninvasively inspect the level and quality of fluid 112, with an inexpensive and/or disposable measuring dipstick 106, which may provide diagnostic information and/or one or more failure indicators for gearbox 104.

Next, method 400 may include an optional step 410, in which fluid is added to gear case. For example, if the user determines in step 408 that the level of fluid 112 in gear box 104 is less than full, the user may add the deficit of fluid 112 to gear case 116 via fill spout 120. Additionally, method 400 may include the user again performing one of more of steps 404, 406, and/or 408, for example, to measure the level of fluid 112 after the user has added fluid in step 410.

Furthermore, method 400 may include a step 412, in which the user replaces the cap on fill spout 120. In some aspects, the user may screw on the cap to fill spout 120 to secure the cap and close fill spout 120.

The measuring dipstick 106 and associated methods may provide a user-friendly process for measuring fluid, such as gearbox fluid for a train. The disclosed features of measuring dipstick 106 may facilitate use in poorly-lit areas, with easily-viewed indicators that provide multiple types of guidance to the user. For example, guidance provided by measuring dipstick 106 may ensure correct orientation, use of the correct measuring dipstick 106 for the particular equipment provided on a locomotive, and immediate identification of fluid level. An angled profile of measuring dipstick 106 may match a curved or otherwise angled profile of fill spout 120 in which measuring dipstick 106 is inserted. Specifically-calibrated spacing between indicators (e.g., holes) on a dipstick portion 110 of measuring dipstick 106 may correspond to a quantity of fluid that should be added for the particular locomotive, particular gearbox system 100, etc.

It will be apparent to those skilled in the art that various modifications and variations can be made to the disclosed devices, systems, and methods without departing from the scope of the disclosure. Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A measuring dipstick for a gear case of a train, comprising:

- a handle configured to extend outside of the gear case when the measuring dipstick extends within an opening of the gear case; and
- an insertion portion including:
  - a plurality of level indicators spaced along the insertion portion at intervals, the plurality of level indicators being at least three level indicators; and
  - a bend in the insertion portion that separates a proximal portion of the insertion portion from a distal portion of the insertion portion, wherein at least one of the level indicators is on the proximal portion and at least one of the level indicators is on the distal portion, and wherein a distance between a level indicator on the proximal portion and an adjacent level indicator, and a different distance between a level indicator on the distal portion and an adjacent level indicator represents a same increment of fluid; and
- an orientation indicator configured to identify a correct orientation for the measuring dipstick when the insertion portion is inserted within the opening of the gear case.

2. The measuring dipstick of claim 1, wherein a distal end of the insertion portion includes an extension, the extension protruding away from a center of the distal portion.

3. The measuring dipstick of claim 1, wherein the orientation indicator is a symbol.

4. The measuring dipstick of claim 1, further including a part-identifying indicator.

5. The measuring dipstick of claim 1, wherein the bend-forms an angle of about 20 degrees to about 80 degrees between the proximal portion and the distal portion of the insertion portion.

6. The measuring dipstick of claim 1, wherein the handle includes a flat portion proximal face.

7. The measuring dipstick of claim 1, wherein the handle includes a flat portion on a lateral side of the handle portion.

8. The measuring dipstick of claim 1, wherein the level indicators include through-holes.

9. The measuring dipstick of claim 8, wherein the intervals at which the indicators are spaced from each other are equal when measured vertically and when the measuring dipstick is viewed from a side of the measuring dipstick when the insertion portion is inserted into the opening of the gear case.

10. A method for measuring a fluid level in a train, comprising:

- removing a cap on a fill spout;
- inserting a measuring dipstick into the fill spout, wherein the measuring dipstick includes a plurality of level indicators spaced along an insertion portion and a bend in the insertion portion that separates a proximal portion of the insertion portion from a distal portion of the insertion portion, with each of the proximal portion and the distal portion having at least one of the plurality of level indicators, the measuring dipstick being oriented based on an orientation indicator-present on the measuring dipstick such that a first spacing between a first set of the plurality of indicators on the proximal portion is different from a second spacing between a second set of the plurality of indicators on the distal portion, wherein the first spacing and the second spacing are different;
- removing the measuring dipstick from the fill spout;
- inspecting the measuring dipstick; and
- replacing the cap on the fill spout.

11. The method of claim 10, wherein, when the inspection indicates that a level of fluid within a gear case is low based on absence of fluid from one or more through-holes in the insertion portion, the method further includes adding fluid to the gear case.

12. The method of claim 11, wherein, after adding fluid to the gear case, the method further includes inserting the measuring dipstick into the fill spout, removing the measuring dipstick from the fill spout, and again inspecting the measuring dipstick.

13. The method of claim 12, wherein inspecting the measuring dipstick includes inspecting the level, color, and/or clarity of the fluid.

14. A measuring dipstick for a gear case of a train, comprising:

- a handle portion configured to extend outside of the gear case when the measuring dipstick extends within an opening of the gear case; and
- an insertion portion including a plurality of indicators spaced along the insertion portion, the indicators formed at a proximal portion of the insertion portion and at a distal portion of the insertion portion, the distal portion extending in a different direction than the proximal portion, wherein a first set of subsequent indicators on the proximal portion have a first spacing and a second set of subsequent indicators on the distal portion have a second spacing, and wherein the first spacing is different from the second spacing.

15. The measuring dipstick of claim 14, wherein the indicators include through-holes and include an extension formed by a protrusion at a distal end of the insertion portion.

16. The measuring dipstick of claim 14, wherein each spacing between the indicators represents a same quantity of fluid.

17. The measuring dipstick of claim 14, wherein the measuring dipstick includes indicators that indicate an correct orientation for the measuring dipstick, a particular part for use with the measuring dipstick, and a level of fluid.

18. The measuring dipstick of claim 17, wherein at least some of the indicators have different forms.

19. The measuring dipstick of claim 18, wherein the indicator that indicates the correct orientation for the measuring dipstick is an arrow.

20. The measuring dipstick of claim 19, further including a bend that causes the proximal portion to extend at an angle of about 20 degrees to about 80 degrees with respect to the distal portion.

* * * * *